United States Patent [19]

Abe et al.

[11] Patent Number: 4,707,062

[45] Date of Patent: Nov. 17, 1987

[54] STAR-SHAPED COUPLER

[75] Inventors: Hiraku Abe; Minoru Uehara; Chiaki Aikawa, all of Furukawa, Japan

[73] Assignee: Alps Electric Co., Ltd., Japan

[21] Appl. No.: 632,441

[22] Filed: Jul. 19, 1984

[30] Foreign Application Priority Data

Jul. 19, 1983 [JP] Japan .............................. 58-111001[U]

[51] Int. Cl.⁴ ................................................ G02B 6/28
[52] U.S. Cl. ................................................ 350/96.16
[58] Field of Search ........................... 350/96.15, 96.16

[56] References Cited

U.S. PATENT DOCUMENTS

| | | | |
|---|---|---|---|
| 3,883,222 | 5/1975 | Gunderson | 350/96.16 |
| 4,184,739 | 1/1980 | d'Auria et al. | 350/96.15 |
| 4,392,712 | 7/1983 | Ozeki | 350/96.16 |
| 4,400,055 | 8/1983 | Ozeki et al. | 350/96.15 |
| 4,423,923 | 1/1984 | Frazier et al. | 350/96.15 |
| 4,568,143 | 2/1986 | Yamada et al. | 350/96.15 |

Primary Examiner—William L. Sikes
Assistant Examiner—Frank González
Attorney, Agent, or Firm—Guy W. Shoup

[57] ABSTRACT

A star-shaped coupler for distributing the light signal emitted by any one of input-output devices among the other devices is disposed among these devices. The coupler comprises a plurality of single-core optical fibers for branching purposes. Each one end of those branching fibers whose number is less than the number of the input-output devices by one is bound together and is opposed to the end surface of the output single-core fiber for one of the input-output devices. The other end surfaces of the branching fibers are opposed to their respective end surfaces of the input single-core fibers for the other input-output devices. The end surfaces of the output fibers for the other input-output devices are connected with the end surfaces of the input fibers through the branching fibers. The other ends of the branching fibers which are opposed to their respective end surfaces of the input fibers are bound together to form bound portions corresponding to the input fibers.

3 Claims, 5 Drawing Figures

STAR-SHAPED COUPLER

FIELD OF THE INVENTION

The present invention relates to a star-shaped coupler which is disposed among a plurality of input-output devices acting to receive and deliver optical signals for distributing the optical signal delivered from any one of the devices to the others.

BACKGROUND OF THE INVENTION

Examples of conventional star-shaped couplers of this kind are shown in FIGS. 1 and 2. The star-shaped coupler 1 shown in FIG. 1 comprises a plurality of optical fibers 2 which are bound and fused together by heating substantially at their centers to form a constricted bound portion 3. The coupler branches into numerous fibers on both sides of the bound portion 3. The optical fibers 4a, 4b, 4c, 4d on the left side as viewed in the figure are used as input fibers, whereas the optical fibers 5a, 5b, 5c, 5d on the right side are employed as output fibers. In use of the coupler 1, the input fiber 4a is connected to the output of one input-output device, and the output fiber 5a is connected to the input of the device. Similarly, the input fibers 4b, 4c, 4d and the output fibers 5b, 5c, 5d are connected to their respective input-output devices. As an example, if the input-output device connected with the input fiber 4a emits light, the light travels through the input fiber 4a, and then it is substantially uniformly dispersed throughout the whole cross section of the waist 3a of the bound portion 3. Thereafter, the light is substantially equally distributed to the output fibers 5a, 5b, 5c, 5d for application to their respective input-output devices.

In the star-shaped coupler 11 shown in FIG. 2 in exploded view, each one end of input optical fibers 12a, 12b, 12c, 12d is jointed together to form a bound portion 14. Likewise, each one end of output optical fibers 13a, 13b, 13c, 13d is jointed together to form a bound portion 15. The opposed end surfaces of the bound portions 14 and 15 are bonded together via a mixing rod 16, though they are shown in spaced apart relation to each other. In use of this coupler, the input fibers 12a-12d and the output fibers 13a-13d are connected to their respective input-output devices in the same way as the aforementioned star-shaped coupler 1. For example, the light signal propagated through the input fiber 12a is dispersed substantially uniformly throughout the cross section of the mixing rod 16. Then, the light is substantially equally distributed to the output fibers 13a, 13b, 13c, 13d before being applied to their respective input-output devices.

In these conventional star-shaped couplers 1 and 2, the signal propagated through the input fiber 4a or 12a, for example, is distributed to all the output fibers 5a-5d 13a-13d via the constricted bound portion 3 or mixing rod 16. However, since the input fiber 4a or 12a and the output fiber 5a or 13a are connected to the same input-output devices, the delivered light signal returns to the same device. This reduces the quantity of light fed to the other input-output devices, thereby increasing the loss in the branching. In particular, it is desired that the light signal traveled through the input optical fiber 4a or 12a, for example, be distributed to three output fibers 5b, 5c, 5d, or 13b, 13c, 13d, but it is distributed to four fibers. It is now assumed that the quantity of light received by the input fiber 4a or 12a is $A_0$ and that the propagation loss is negligible. Then, if the light is distributed to three fibers, the quantity of light supplied to each output fiber is $A_0/3$. In the conventional devices, however, the light is distributed to four fibers and, accordingly, the quantity of light distributed to each fiber is $A_0/4$. In this way, the loss in branching is greater than the ideal configuration.

SUMMARY OF THE INVENTION

In view of the foregoing situation, it is the main object of the present invention to provide a star-shaped coupler which supplies the light signal delivered from any one of input-output devices to the others in an efficient manner without allowing the signal to reenter the same device, thereby producing a less loss in branching.

This object is achieved in accordance with the teachings of the present invention by a star-shaped coupler which comprises a plurality of single-core optical fibers for branching, and which is interposed among each end surface of output single-core optical fibers and each end surface of input single-core optical fibers, the input and output fibers forming pairs and being connected to their respective input-output devices that receive and deliver light signals, the coupler acting to distribute the light signal emitted from the output fiber for any one of the input output devices among the input optical fibers for the other devices. Each one end of those branching fibers whose number is less than the number of said input-output devices by one is bound together and is opposed to the end surface of the output fiber for one of the input-output devices. The branching fibers are separated from each other and each other end surface is opposed to respective one of the end surfaces of the input fibers for the other input-output devices. The end surfaces of the output fibers for the other input-output devices are connected via the branching fibers with the end surfaces of the input fibers in the same manner as the foregoing. The other ends of the branching fibers which are opposed to their respective end surfaces of the input fibers are bound together to form bound portions.

Other and further objects of the invention will become obvious upon an understanding of the illustrative embodiment about to be described or will be indicated in the appended claims, and various advantages not referred to herein will occur to one skilled in the art upon employment of the invention in practice.

DETAILED DESCRIPTION OF THE INVENTION

Figure 1:
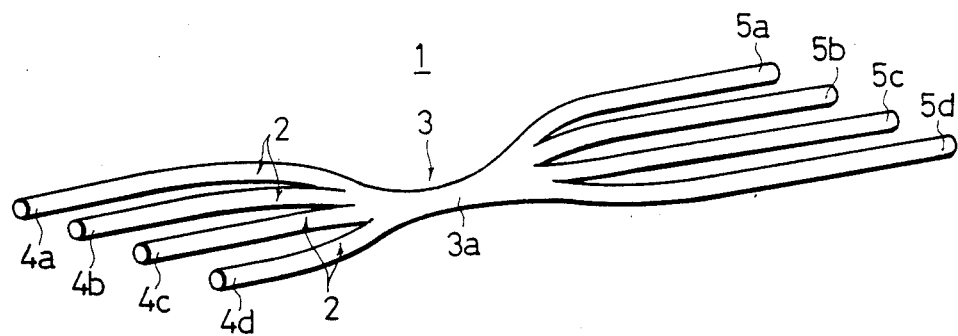
FIG. 1 is a perspective view of a conventional star-shaped coupler.
Figure 2:
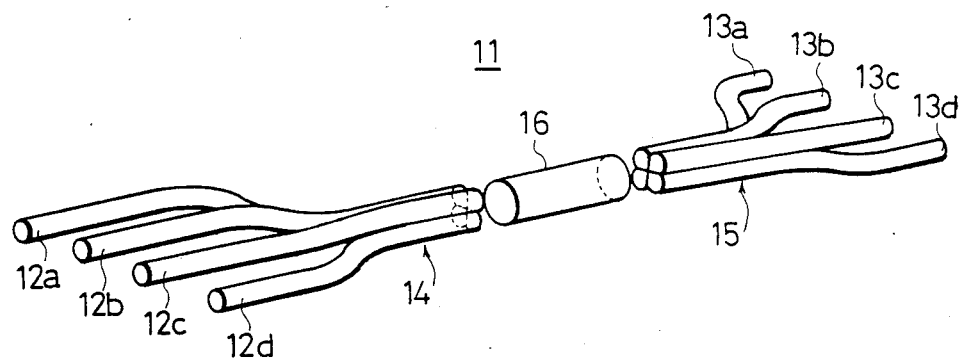
FIG. 2 is an exploded perspective view of another conventional star-shaped coupler.
Figure 3:
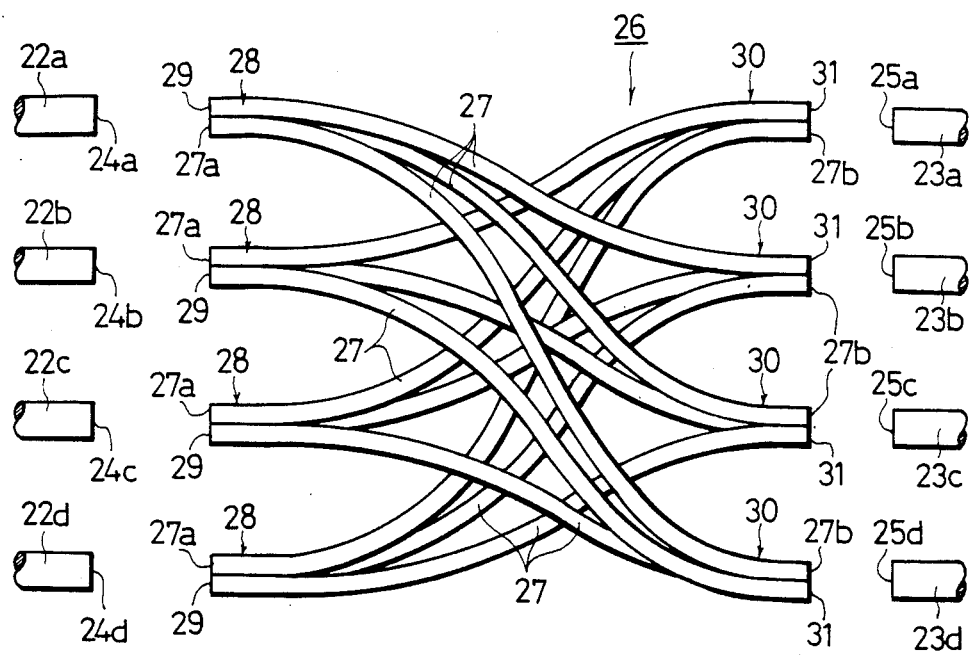
FIG. 3 is a plan view of a star-shaped coupler according to the invention and in which output and input single-core optical fibers are shown in separated relation.
Figure 4:
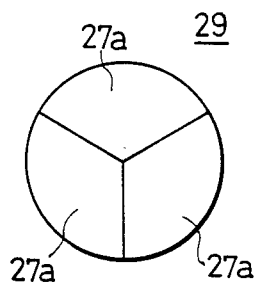
FIGS. 4 and 5 are front elevations of the end surfaces on both sides of the bound portions of the coupler shown in FIG. 3.
Figure 5:
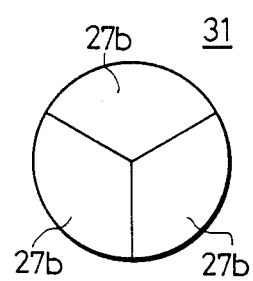

Referring to FIGS. 3-5, there is shown an arrangement utilizing a star-shaped coupler embodying the concept of the present invention. This arrangement has output single-core optical fibers 22a, 22b, 22c, 22d, and input single-core optical fibers 23a, 23b, 23c, 23d. The fibers 22a and 23a form a pair and are connected to an input-output device (not shown). Similarly, the fibers 22b and 23b, 22c and 23c, and 22d and 23d form pairs and are connected to their respective input-output devices (not shown). More specifically, the output fiber 22a is connected to the output of the input-output device which receives and delivers a light signal, the input fiber 23a being connected to the input of the device. The other pairs are connected in the same fashion. The star-shaped coupler 26 which acts to distribute the light signal from any one of the input-output devices to the others is interposed among the end surfaces 24a–24d of the output fibers 22a–22d and the end surfaces 25a–25d of the input fibers 23a–23d. The coupler 26 consists of (n−1) single-core optical fibers 27 for branching purposes, where n is the number of the input-output devices. In this specific example, n is four. The output fibers 22a–22d for one input-output device are connected to the input fibers 23a–23d for the other input-output devices through these branching fibers 27.

More specifically, each one end of each three of these branching fibers 27 is bound together as shown, and the bound ends are fused together by heating using a mold to make cylindrical bound portions 28 which are identical in diameter to the output fibers 22a–22d. As shown in FIG. 4, each one end surface 27a of three branching fibers 27 is shaped into a sector of a certain area such that the three end surfaces 27a form the circular end surfaces 29 of each bound portion 28. The end surfaces 29 of these bound portions 28 are bonded to the end surfaces 24a–24d, respectively, of the output fibers 22a–22d with adhesive, although they are shown in spaced apart relation for the sake of illustration. In discussing three branching optical fibers 27 joined to the output fiber 22a, the bound portion 28 branches into the three fibers 27 the other end surfaces 27b of which are joined to the end surfaces 25b, 25c, 25d, respectively, of all the input fibers 23b, 23c, 23d except for the input fiber 23a that forms a pair with the output fiber 22a. The branching fibers 27 which are joined to the other outputs fibers 22b, 22c, 22d are also connected in the same way.

Also, the other ends of the three branching fibers 27 are joined to the input fibers 23a, 23b, 23c, 23d by heating and binding together these ends using a mold to form cylindircal bound portions 30 having substantially the same diameter as the input fibers 23a–23d. As shown in FIG. 5, in the end surface 31 of each bound portion 30, the other end surfaces 27b of the three branching fibers 27 are each shaped into a sector of a certain area so that they may form a circle. The other end surfaces 27b are joined to the input fibers 23a–23d, respectively.

The operation of the star-shaped coupler 21 constructed as described above is now described. As an example, a light signal which is passed through the output optical fiber 22a after it is emitted by an input-output device goes out of the end surface 24a, and then it enters the corresponding end surface 29 of the bound portion of the star-shaped coupler 26. Because this end surface 29 is tightly coupled to the end surface 24a of the output fiber 22a and has substantially the same diameter as the end surface 24a, only a small fraction of the light quantity is lost when the light enters the end surface 29. Then, the light signal is divided into three, which then travel through the branching fibers 27. Subsequently, the divided light signals exit from the other end surfaces 27b of the branching fibers 27 which lie in three different bound portions 30. Then, the light signals enter the end surfaces 25b, 25c, 25d, respectively, of the input fibers 23b, 23c, 23d, and they pass through these single-core fibers 23b, 23c, 23d. Finally, the signals are furnished to three input-output devices which are not connected with the output fiber 22a. The light signals from the other output fibers 22b, 22c, 22d are propagated in the same manner. Thus, employment of the novel star-shaped coupler 26 eliminates the possibility that the light signal emitted by any one input-output device returns to it. It is now assumed that the quantity of light emitted from each of the output fibers 22a–22d is equal to $A_0$ and that all the losses other than the branching loss such as propagation loss can be neglected. Then, the quantity of light entering each of the input fibers 23a–23d is $A_0/3$. It can be seen that the loss due to branching is reduced as compared with the similar conventional devices by comparing this with the conventional cases where the quantity of the incident light is $A_0/4$.

Although the star-shaped coupler 26 described in the above embodiment is designed to correspond to four input-output devices, it is obvious that the inventive coupler can be designed to correspond to any number of input-output devices.

As thus far described, the coupler according to the invention is capable of distributing the light signal emitted from any one of input-output devices among the others without allowing the signal to reenter the device, thus reducing the loss due to the branching of light. Hence, the propagation loss of light signal can be reduced.

What is claimed is:

1. In a star-shaped coupler interposed between the end surfaces of a plurality of n output single-core optical fibers and the end surfaces of a plurality of n input single-core optical fibers, each one of said n output fibers being paired with a respective one of said n input fibers and are connected to respective ones of a plurality of n input-output devices which receive and deliver light signals, the coupler acting to distribute a light signal emitted from an output fiber of any one of the input-output devices among the input optical fibers for the other input-output devices, the improvement wherein:
(a) said star-shaped coupler is comprised of n branching fiber portions each associated with a respective one of said n input-output devices;
(b) each of said n branching fiber portions consists of a plurality of branching fibers which are less than n in number, wherein the ends of one side of said branching fibers are bound together to form a single-core end surface opposed to the end surface of the output fiber for one of said input-output devices, and the ends on the other side of said branching fibers are distributed so that each is opposed respectively to an end surface of an input fiber of respective ones of the other input-output devices, excluding said one input-output device, and the others of said n branching fiber portions similarly having branching fibers less than n in number whose other ends are likewise distributed to be opposed to the end surfaces of the input fibers of other ones of said n input-output devices; and
(c) the other ends of the distributed branching fibers which are opposed to a respective one of said input fibers are bound together to form a single-core end surface opposed to the end surface of said input fiber.

2. A star-shaped coupler according to claim 1, wherein said ends of said branching fibers are bound together in bound portions which are formed in a shape matching the shape of the respective end surfaces of the input and output fibers.

3. In the star-shaped coupler as set forth in claim 2, the further improvement wherein each of the bound portions is formed by heating the associated ends and coupling them together using a mold.

* * * * *